(12) United States Patent
Chen

(10) Patent No.: US 7,475,631 B2
(45) Date of Patent: Jan. 13, 2009

(54) PISTON ASSEMBLY FOR A FOOD EXTRUDER

(76) Inventor: Yu-Cheng Chen, No. 18, Lane 105, Pei Feng Rd., Wu Feng Hsiang (TW)

( * ) Notice: Subject to any disclaimer, the term of this patent is extended or adjusted under 35 U.S.C. 154(b) by 296 days.

(21) Appl. No.: 11/409,368

(22) Filed: Apr. 20, 2006

(65) Prior Publication Data

US 2007/0245893 A1    Oct. 25, 2007

(51) Int. Cl.
*A23L 1/00* (2006.01)
(52) U.S. Cl. .................................. 99/353; 99/450.1
(58) Field of Classification Search ........... 99/352–355, 99/444–450, 450.1, 450.2, 450.6, 450.7, 99/483; 425/382.4, 191, 192 R, 461, 308, 425/377, 464, 465; 222/386, 333, 390; 426/516, 426/517

See application file for complete search history.

(56) References Cited

U.S. PATENT DOCUMENTS

| | | | | |
|---|---|---|---|---|
| 1,591,265 A | * | 7/1926 | Baccellieri | 425/464 |
| 1,713,585 A | * | 5/1929 | Wolf | 425/311 |
| 1,881,171 A | * | 10/1932 | Cooley | 426/513 |
| 4,060,367 A | * | 11/1977 | Shatila et al. | 425/311 |
| 4,154,130 A | * | 5/1979 | Smith et al. | 83/525 |
| 4,465,452 A | * | 8/1984 | Masuzawa | 425/308 |

* cited by examiner

Primary Examiner—Timothy F. Simone
(74) Attorney, Agent, or Firm—patenttm.us

(57) ABSTRACT

A piston assembly for a food extruder having a food reservoir with a chamber and an inner surface, a piston rod and a piston dish. The piston rod slidably extends into the chamber of the food reservoir. The piston dish is attached loosely to the piston rod and has a lower segment, an upper segment, an annular groove and a sealing ring. The lower segment has an outer surface with an inclined bottom edge. The upper segment is hollow and is formed with the lower segment. The annular groove is formed in the outer surface of the lower segment adjacent to the upper segment. The sealing ring is mounted in the annular groove and slidably presses against the inner surface of the food reservoir to form an airtight seal.

3 Claims, 7 Drawing Sheets

PISTON ASSEMBLY FOR A FOOD EXTRUDER

BACKGROUND OF THE INVENTION

1. Field of the Invention

The present invention relates to a piston assembly, and more particularly to a piston assembly for a food extruder, which is airtight and operates without canting.

2. Description of Related Art

With reference to FIGS. 4 to 7, a conventional food extruder (50) in accordance with the prior art comprises a base (51), a housing (53), a drive assembly (56), a food reservoir (52) and a piston assembly (54).

The housing (53) is mounted on and protrudes up from the base (51) and has two side panels (55) and an upper bracket (57). The side panels (55) are mounted parallel to each other on the base (51), and each side panel (55) has a top end and an inside surface. The upper bracket (57) is U-shaped, is attached to the inside surfaces of the side panels (55) at the top ends.

The drive assembly (56) extends through and is attached one of the side panels (55) and has a gear assembly and a handle (561). The gear assembly is mounted rotatably in the upper bracket (57) and has multiple gears. The multiple gears include a bull gear and a pinion. The handle (561) is mounted through one of the side panels (55) and engages and rotates the bull gear when the handle (561) is turned.

The food reservoir (52) is hollow and cylindrical, is mounted between the side panels (55) below the upper bracket (57), holds food to be extruded from the food reservoir (52) and has an open upper end, a closed lower end, a chamber, an inner surface and a stuffing pipe (521). The open upper end of the food reservoir (52) faces the upper bracket (57). The closed lower end of the food reservoir (52) is near the base (51). The chamber is defined inside the food reservoir (52) to hold food. The stuffing pipe (521) allows food to be extruded from the chamber, is formed on the closed lower of the food reservoir (52) and communicates with the chamber.

The piston assembly (54) is mounted slidably through the upper bracket (57), connects to and is driven by the pinion of the gear assembly of the drive assembly, extends into or retracts from the food reservoir (52) when the handle (561) is turned and has a piston rod (541) and a piston dish (542). The piston rod (541) engages the pinion of the gear assembly of the drive assembly (56), slidably extends into or retracts from the chamber of the food reservoir (52) when the handle (561) is turned and has an upper end, a lower end and a rack. The upper end of the piston rod (541) is mounted slidably in and protrudes through the upper bracket (57). The lower end of the piston rod (541) is extends into or retracts from the chamber of food reservoir (52) when the handle (561) is turned. The rack is mounted longitudinally on the piston rod (541) between the upper and lower ends and engages the pinion.

The piston dish (542) is circular, is attached to the lower end of the piston rod (541), slides inside the food reservoir (52) and has a center, a central through hole, a fastener, an outer edge and a sealing ring (5421). The central through hole is formed through the center of the piston (542). The fastener may be a bolt, extends through the central through hole and attaches longitudinally to the lower end of the piston rod (541). The sealing ring (5421) is mounted around the outer of the piston dish (542) and presses against the inner surface of the food reservoir (52).

However, defects and shortcomings of the conventional food extruder (50) follow.

The piston dish (542) of the piston assembly (54) is attached to the lower end of the piston rod (541), and sealing ring (5421) slides against the inner surface of the food reservoir (52). When the piston dish (542) moves down and presses against food in the food reservoir (52), variations in the density and distribution of food in the food reservoir (52) applies uneven forces to the piston dish (542), which may cause the piston dish (542) to cant to an extent that the rack on the piston rod (541) disengages partially or completely from the pinion and results in partial or complete reduction of operational efficiency of the piston assembly (50) or damage to the food extruder (50).

2. When the piston dish (542) is canted in the food reservoir (52), a gap may form between the piston dish (542) and the inner surface of the food reservoir (52) such that some food in the food reservoir (52) squeezes around the piston dish (542) rather than being extruded from the stuffing pipe (521). Therefore, the conventional piston assembly (50) is not convenient in operation.

To overcome the shortcomings, the present invention provides a piston assembly for a food extruder to mitigate or obviate the aforementioned problems.

SUMMARY OF THE INVENTION

The main objective of the present invention is to provide a piston assembly for a food extruder, is airtight, convenient to use and will not cant.

The piston assembly for a food extruder having a food reservoir with a chamber and an inner surface, a piston rod and a piston dish. The piston rod slidably extends into the chamber of the food reservoir. The piston dish is attached loosely to the piston rod and has a lower segment, an upper segment, an annular groove and a sealing ring. The lower segment has an outer surface with an inclined bottom edge. The upper segment is hollow and is formed with the lower segment. The annular groove is formed in the outer surface of the lower segment adjacent to the upper segment. The sealing ring is mounted in the annular groove and slidably presses against the inner surface of the food reservoir to form an airtight seal.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
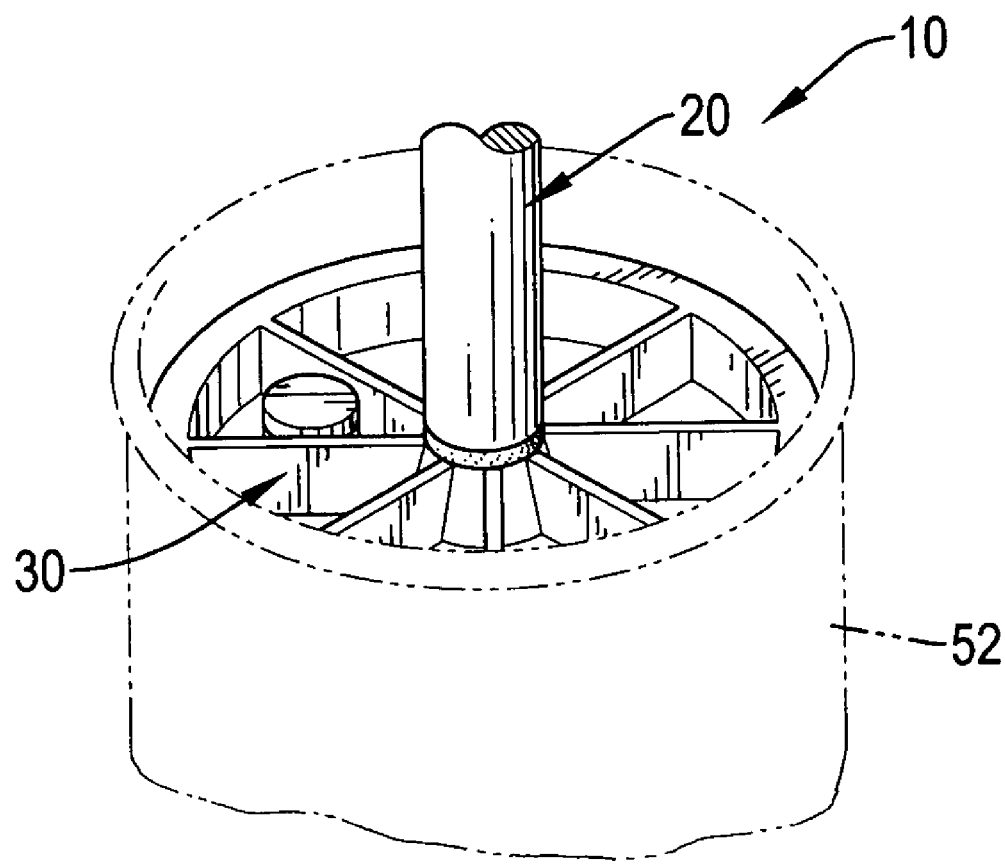
FIG. 1 is a perspective view of a piston assembly in accordance with the present invention mounted in a food reservoir of a food extruder.

With reference to FIG. 1, a piston assembly (10) in accordance with the present invention for a food extruder having a food reservoir (52) with a chamber and an inner surface pushes food out of the food reservoir (52) and comprises a piston rod (20) and a piston dish (30).

Figure 2:
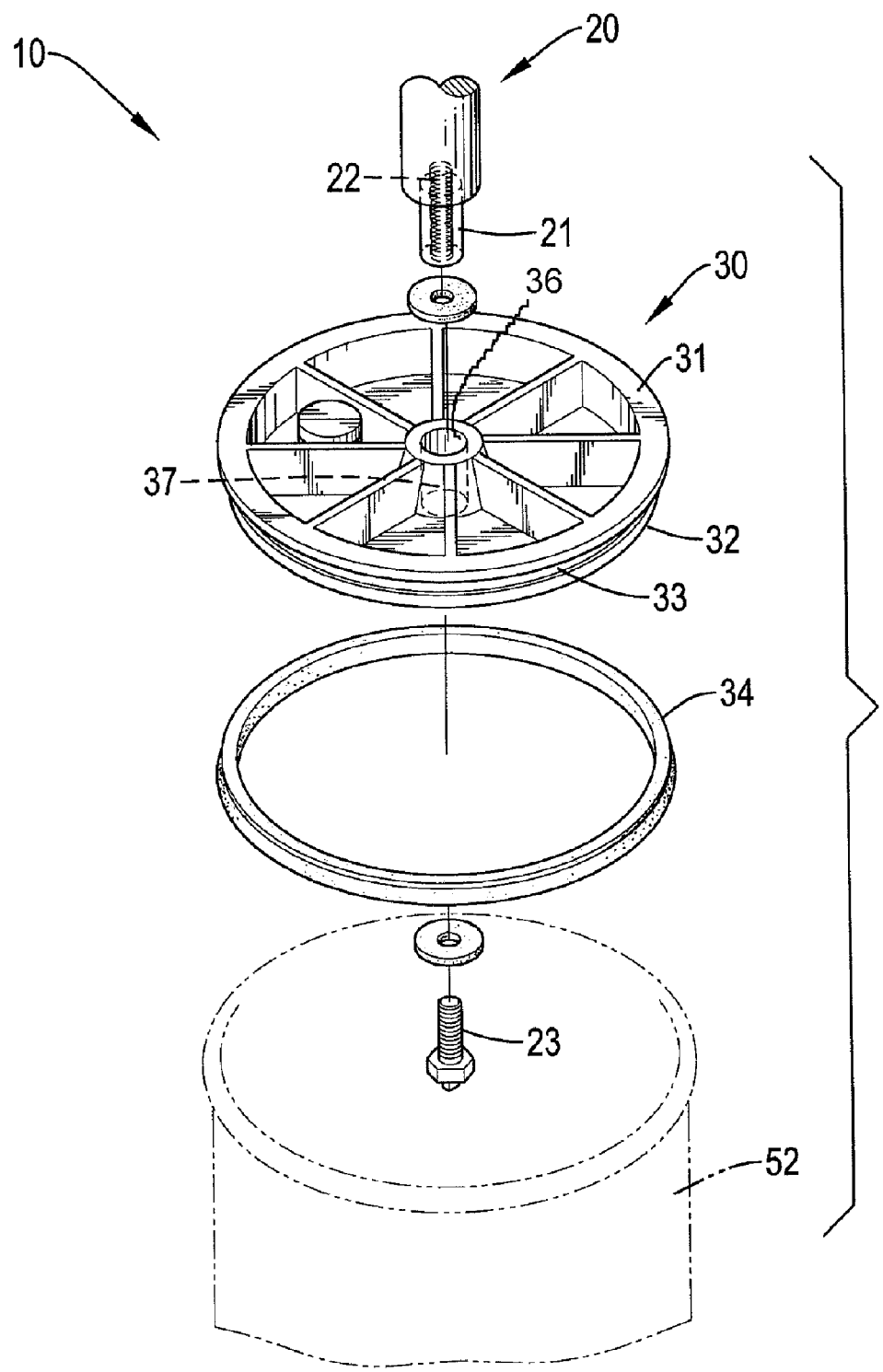
FIG. 2 is an exploded perspective view of the piston assembly in FIG. 1.

With further reference to FIG. 2, the piston rod (20) slidably extends into the chamber of the food reservoir (52) and has a lower end, an optional connecting post (21), an optional mounting hole (22) and an optional fastener (23). The connecting post (21) is formed on and protrudes coaxially from the lower end of the piston rod (20). The mounting hole (22) is formed coaxially through the connecting post (21) into the lower end of the piston rod (20) and may be threaded. The fastener (23) is mounted securely in the mounting hole (22) and may be a bolt. The bolt screws into the threaded mounting hole (22).

Figure 3:
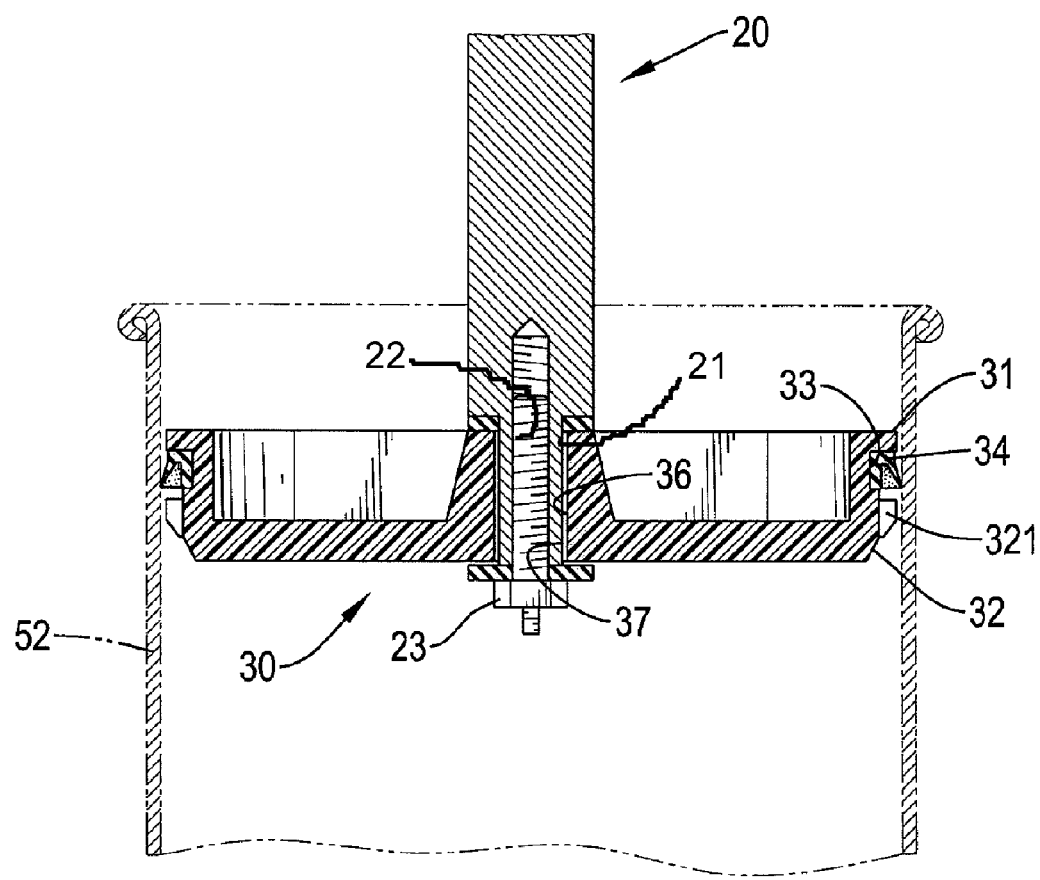
FIG. 3 is an operational side view in partial section of the piston assembly in FIG. 1 mounted in a food reservoir of a food extruder.
Figure 4:
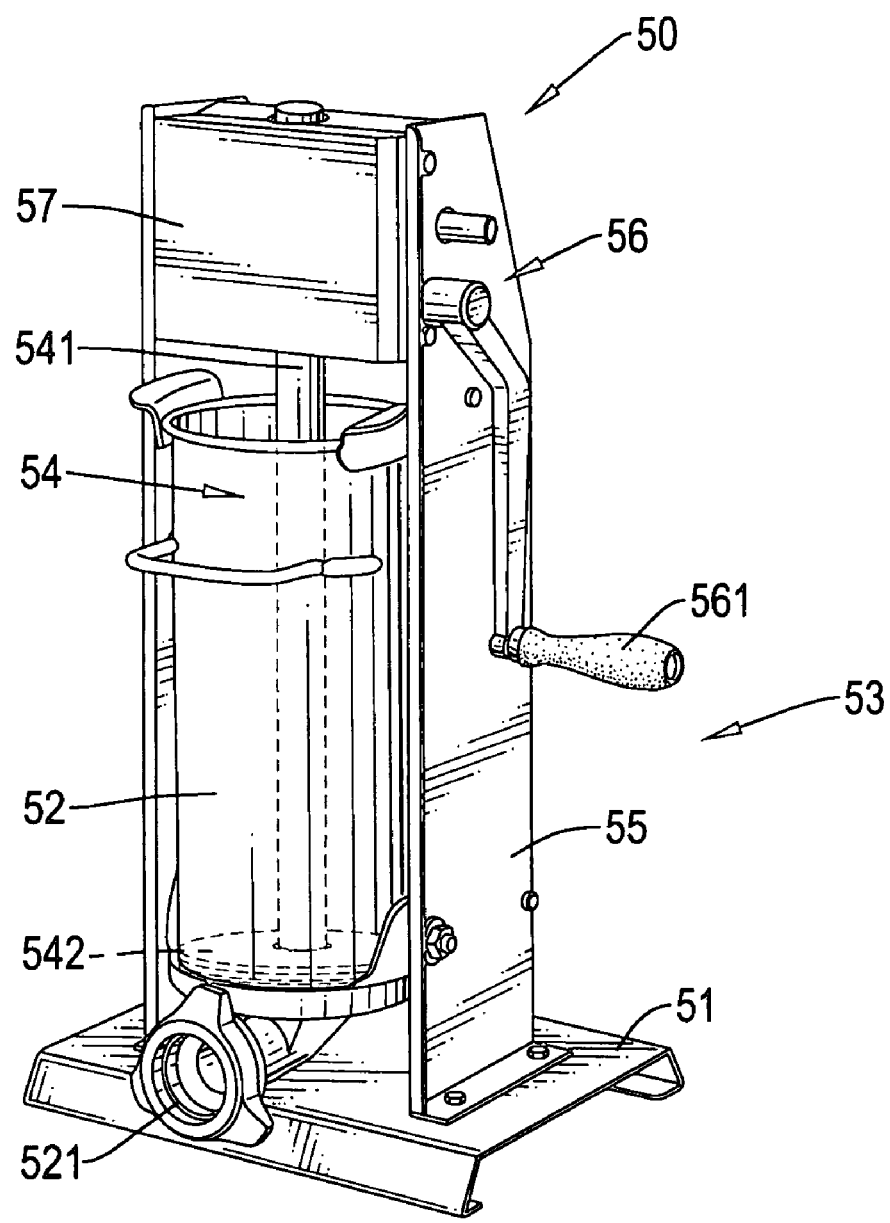
FIG. 4 is a perspective view of a conventional food extruder in accordance with the prior art.
Figure 5:
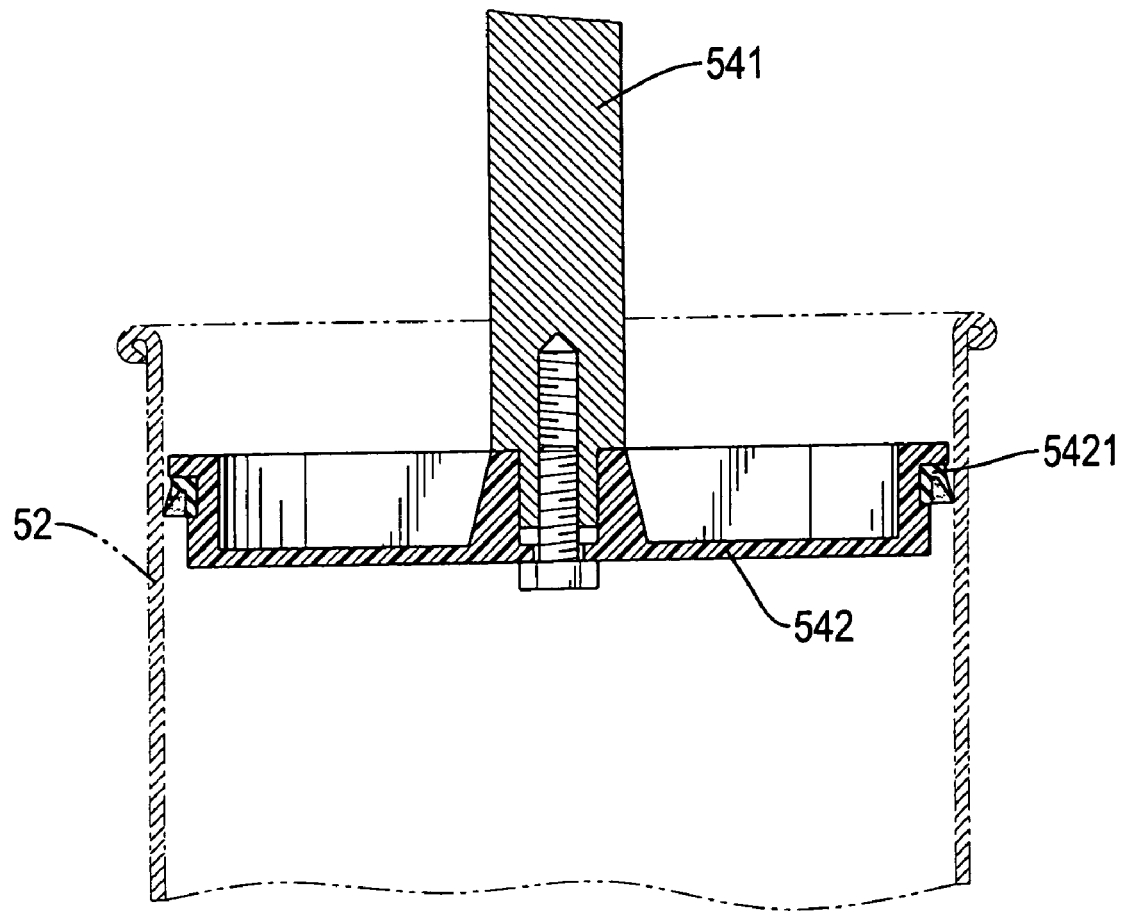
FIG. 5 is an operational side view in partial section of the piston assembly in FIG. 4 mounted in a food reservoir of the food extruder.
Figure 6:
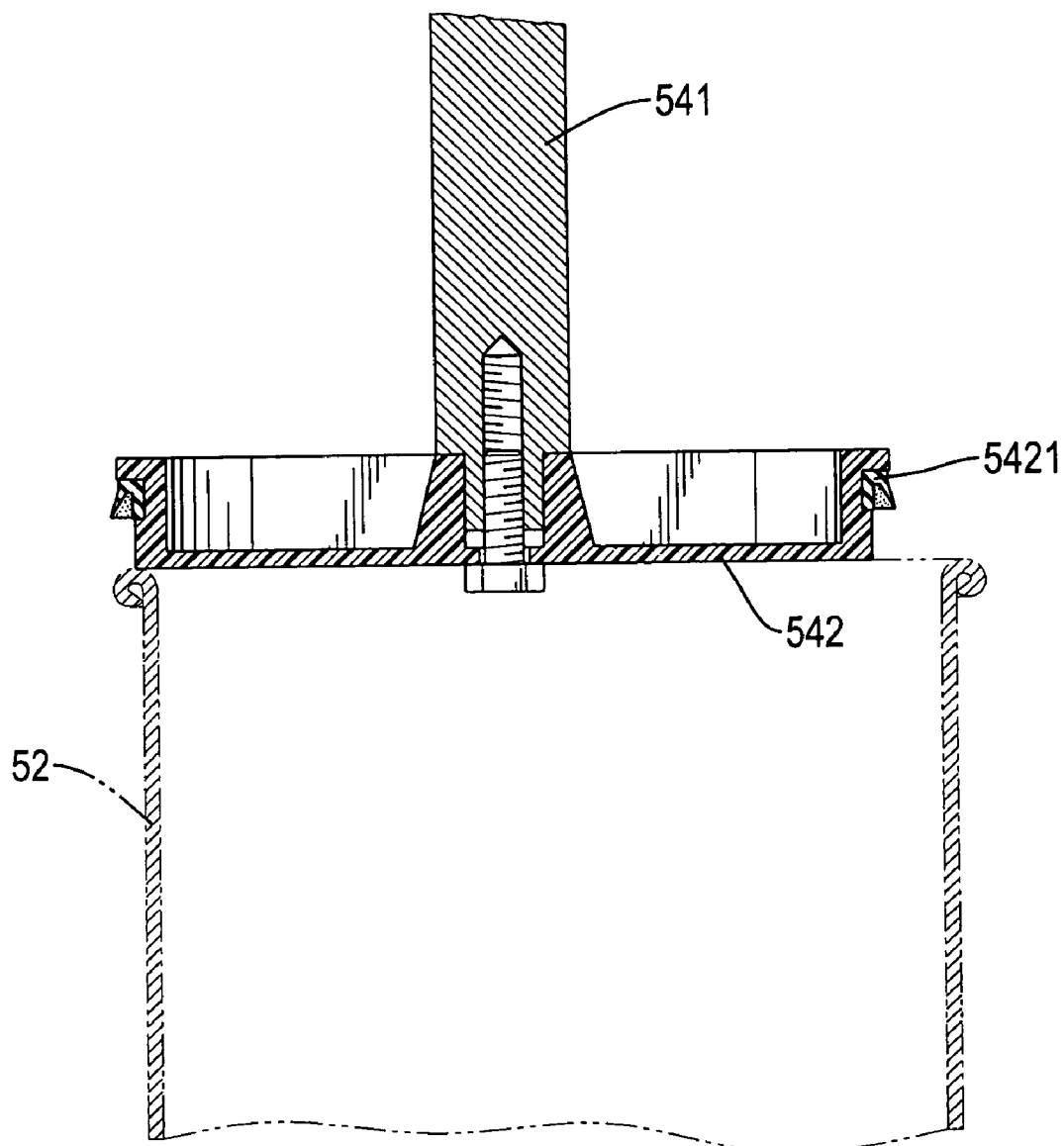
FIG. 6 is an operational side view in partial section of the piston assembly in FIG. 4 moved out the food reservoir of the food extruder.
Figure 7:
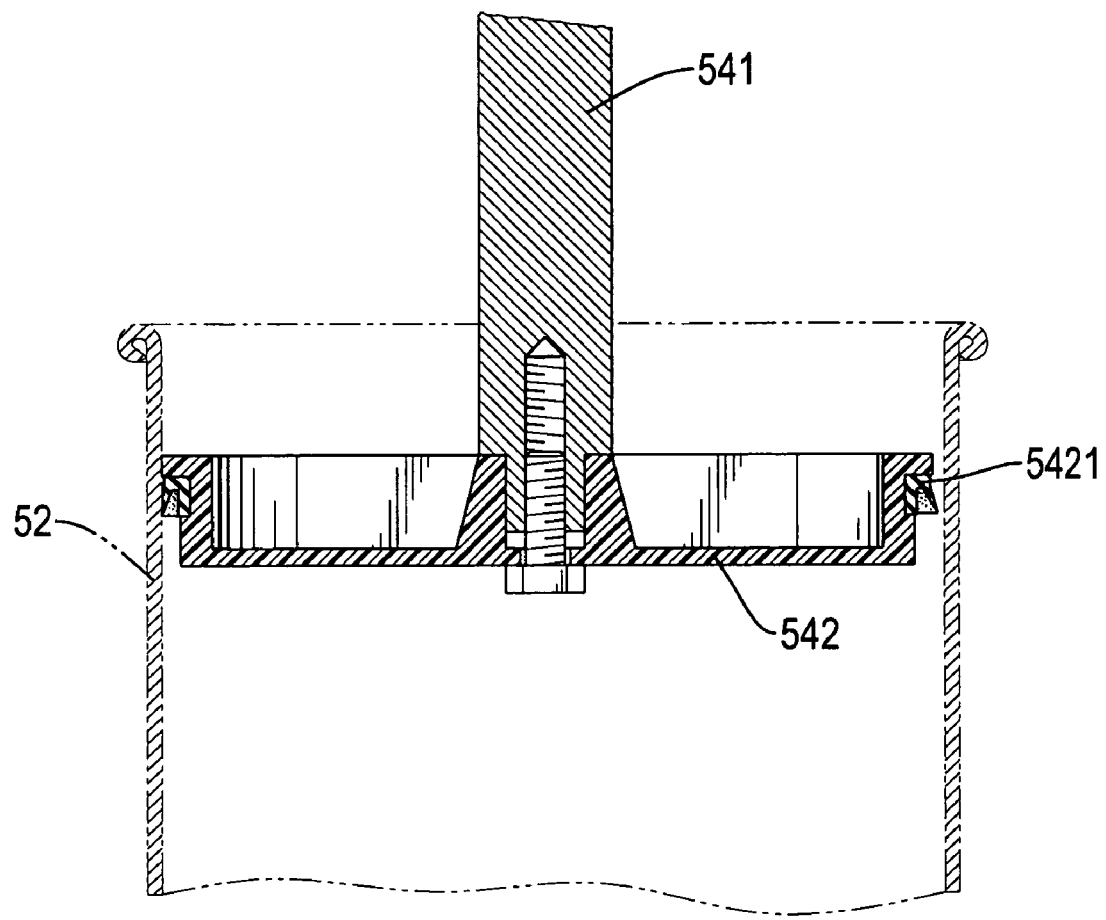
FIG. 7 is an operational side view in partial section of the piston assembly in FIG. 4 mounted in a food reservoir of the food extruder.

The piston dish (30) is circular, is attached loosely to the piston rod (20) with a clearance between the connecting post (21) and the piston dish (30) as shown in FIG. 3 by the fastener (23) mounted in the mounting hole (22) and has a lower segment (32), an optional mounting recess (36), an optional through hole (37), an upper segment (31), an annular groove (33) and a sealing ring (34).

The lower segment (32) of the piston dish (30) has a top, a closed bottom, an outer surface, multiple optional anti-cant protrusions (321) and a center. The outer surface has an inclined bottom edge. With further reference to FIG. 3, the inclined bottom edge allows food in the food reservoir (52) to squeeze between the outer surface of the lower segment (32) and the inner surface of the food reservoir (52) and keep the piston (30) from canting excessively. The anti-cant protrusions (321) are trapezoidal, are formed on and protrude out from the outer surface of the lower segment (32) and face, abut and slide on the inner surface of the food reservoir (52) to prevent the piston dish (30) from canting enough to form a gap between the piston dish (30) and the inner surface of the food reservoir (52).

The mounting recess (36) is formed in the top of the lower segment (32) at the center and holds the connecting post (21) of the piston rod (20).

The through hole (37) is formed through the center of the lower segment (32) and communicates with the mounting recess (36).

The upper segment (31) is hollow and is formed with and protrudes slightly out from the outer surface of the lower segment (32).

The annular groove (33) is formed in the outer surface of the lower segment (32) adjacent to the upper segment (31).

The sealing ring (34) is mounted in the annular groove (33) and slidably presses against the inner surface of the food reservoir (52) to form an airtight seal and keep food pressed between the lower segment (32) and the inner surface of the food reservoir (52) from squeezing past the piston dish (30).

The connecting post (21) extends through and protrudes from the mounting recess (36) into the through hole (37) and is mounted securely with the fastener (23).

The piston assembly (10) in accordance with the present invention has the following advantages.

The piston dish (30) is connected loosely to the lower end of the piston rod (20) with a clearance between the connecting post (21) of the piston rod and the mounting recess of the piston dish (30) and the lower segment (32) has an inclined bottom edge. Food pressed by the piston dish (30) moves more evenly between the lower segment (32) and the inner surface of the food reservoir (52) which keeps the piston (30) from canting excessively. Furthermore, the loose connection between the piston dish (30) and the piston rod (20) keeps a slightly canted the piston dish (30) from causing the piston rod (20) to disengage or misalign with operating elements of the food extruder. Consequently, the piston rod (20) operates more smoothly.

2. When the piston assembly (10) is used, the lower segment (32) will push the food press against the sealing ring (34) between the anti-cant protrusions (321) more evenly. Then, the piston assembly (10) will be more airtight, and food that pressed by the piston (30) will not squeeze between the food reservoir (52) and the piston (30).

Even though numerous characteristics and advantages of the present utility model have been set forth in the foregoing description, together with details of the structure and features of the utility model, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A piston assembly for a food extruder having a food reservoir that has a chamber and an inner surface, the piston assembly having
    a piston rod adapted for slidably extending into the chamber of the food reservoir and having a lower end; and
    a piston dish being circular, attached to the piston rod with
        a clearance between the lower end of the piston rod and the piston dish and having
        a lower segment having
            a top;
            a closed bottom;
            an outer surface having an inclined bottom edge; and
            a center; and
            multiple anti-cant protrusions being trapezoid, formed on and protruding out from the outer surface of the lower segment and adapted for facing, abutting and sliding on the inner surface of the food reservoir;
        an upper segment being hollow and formed with and protruding out from the outer surface of the lower segment;
        an annular groove formed in the outer surface of the lower segment adjacent to the upper segment; and
        a sealing ring mounted in the annular groove and adapted for slidably pressing against the inner surface of the food reservoir.

2. The piston assembly as claimed in claim 1, wherein the piston rod has
    a connecting post formed on and protruding coaxially from the lower end of the piston rod;
    a mounting hole formed coaxially through the connecting post into the lower end of the piston rod; and
    a fastener mounted securely in the mounting hole; and the piston dish further has
    a mounting recess formed in the top of the lower segment at the center and holds the connecting post of the piston rod;
    a through hole formed through the center of the lower segment and communicating with the mounting recess.

3. The piston assembly as claimed in claim 2, wherein the mounting hole in the piston rod is threaded;
the fastener of the piston rod is a bolt that screws into the mounting hole; and
the piston dish is attached loosely to the piston rod by the fastener.

* * * * *